United States Patent
Chan et al.

(10) Patent No.: US 10,051,508 B2
(45) Date of Patent: Aug. 14, 2018

(54) SYSTEM AND METHOD FOR MOBILITY SUPPORT SELECTION

(71) Applicant: Futurewei Technologies, Inc., Plano, TX (US)

(72) Inventors: Hinghung Anthony Chan, Plano, TX (US); XinPeng Wei, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 202 days.

(21) Appl. No.: 14/933,629

(22) Filed: Nov. 5, 2015

(65) Prior Publication Data

US 2016/0135035 A1    May 12, 2016

Related U.S. Application Data

(60) Provisional application No. 62/077,807, filed on Nov. 10, 2014.

(51) Int. Cl.
| | |
|---|---|
| *H04W 8/08* | (2009.01) |
| *H04W 28/02* | (2009.01) |
| *H04W 8/18* | (2009.01) |
| *H04L 12/859* | (2013.01) |
| *H04W 80/04* | (2009.01) |

(52) U.S. Cl.
CPC ..... *H04W 28/0226* (2013.01); *H04L 47/2475* (2013.01); *H04W 8/18* (2013.01); *H04W 28/0268* (2013.01); *H04W 80/04* (2013.01)

(58) Field of Classification Search
CPC ............... H04W 28/0226; H04W 8/18; H04W 28/0268; H04L 47/2475
See application file for complete search history.

(56) References Cited

U.S. PATENT DOCUMENTS

| | | | |
|---|---|---|---|
| 8,081,611 B2 | 12/2011 | Berzin et al. | |
| 2006/0233144 A1* | 10/2006 | Matsumoto | H04L 63/08 370/338 |
| 2011/0002220 A1* | 1/2011 | Park | H04W 60/005 370/230 |
| 2012/0142352 A1* | 6/2012 | Zhang | H04W 36/0072 455/436 |
| 2012/0258674 A1* | 10/2012 | Livet | H04B 1/38 455/73 |
| 2014/0241158 A1* | 8/2014 | Anthony, Jr. | H04W 28/0231 370/235 |

FOREIGN PATENT DOCUMENTS

| | | |
|---|---|---|
| CN | 103229558 A | 7/2013 |
| KR | 101204789 B1 | 11/2012 |

* cited by examiner

*Primary Examiner* — Yemane Mesfin
*Assistant Examiner* — Henry Baron
(74) *Attorney, Agent, or Firm* — Slater Matsil, LLP

(57) ABSTRACT

A method for mobility support selection includes determining a mobility class of a first application executing on a device, and determining if a subset of a plurality of available mobility support techniques associated with the entity one of meets and exceeds requirements of the mobility class of the first application. When the subset of the plurality of available mobility support techniques associated with the entity one of meets and exceeds the requirements of the mobility class of the first application, the method comprises selecting a mobility support technique from the subset of the plurality of available mobility support techniques, and sharing information related to the selected mobility support technique with other entities.

22 Claims, 8 Drawing Sheets

| | APPLICATION | | SESSION | | IP | | L2 |
|---|---|---|---|---|---|---|---|
| | HTTP/SIP | OTHER | MPTCP | OTHER | HOST-BASED | NETWORK BASED | OTHER |
| ... | | | | | | | |
| COS CATEGORY I (E.G., MAX 1 MS HANDOVER DELAY) | | | | | | | |
| COS CATEGORY II (E.G., MAX 10 MS HANDOVER DELAY) | | | | | | | |
| COS CATEGORY III (E.G., MAX 100 MS HANDOVER DELAY) | | | | | | | |
| COS CATEGORY IV (E.G., MAX 1 S HANDOVER DELAY) | | | | | | | |
| ... | | | | | | | |

Fig. 4

SYSTEM AND METHOD FOR MOBILITY SUPPORT SELECTION

This application claims the benefit of U.S. Provisional Application No. 62/077,807, filed on Nov. 10, 2014, entitled "System and Method for Mobility Support Selection," which application is hereby incorporated herein by reference.

TECHNICAL FIELD

The present disclosure relates generally to digital communications, and more particularly to a system and method for mobility support selection.

BACKGROUND

In existing Third Generation Partnership Project (3GPP) evolved packet core (EPC) networks, mobility management is provided by default in a packet data network (PDN) connection using a general packet radio service (GPRS) tunneling protocol (GTP) tunnel. Otherwise, the traffic is offloaded to bypass the mobile core network. These two choices are not enough to meet the needs of different applications.

In particular, applications have diverse needs of mobility management. Some applications do not need session continuity, and some applications need session continuity. In addition, the quality of service (QoS) requirements on mobility are also diverse in current and emerging applications. In 5G Wireless, the handover delay tolerances for stringent applications are on the order of 10 milliseconds (ms), 1 ms or even sub-ms, whereas those for less stringent applications can be on the order 100 ms, 1 second or even 10 seconds.

These diverse requirements are difficult to meet using a one-size-fits-all solution. For example, a mobility solution for applications with the most relaxed requirements can be much simpler and involve less signaling cost. Using a tight tolerance application mobility solution for all applications can be an overkill and too expensive for the less stringent applications.

Multiple mobility management mechanisms are available currently and more may become available in the future. Examples include the following: application-layer mobility support, transport layer mobility support such as multipath transmission control protocol (TCP), host-based Internet protocol (IP) mobility support such as host-based mobile IP (MIPv6), network-based IP mobility support such as proxy mobile IPv6 (PMIPv6), link-layer mobility support, and the like. It is then necessary to determine whether or not to provide mobility support, and, if so, choose the appropriate mobility support for a given application.

SUMMARY OF THE DISCLOSURE

Example embodiments provide a system and method for mobility support selection.

In accordance with an example embodiment, a method for mobility support selection is provided. The method includes determining, by an entity, a mobility class of a first application executing on a device, and determining, by the entity, if a subset of a plurality of available mobility support techniques associated with the entity one of meets and exceeds requirements of the mobility class of the first application. When the subset of the plurality of available mobility support techniques associated with the entity one of meets and exceeds the requirements of the mobility class of the first application, the method includes selecting, by the entity, a mobility support technique from the subset of the plurality of available mobility support techniques, evoking, by the entity, the selected mobility support technique, and sharing, by the entity, information related to the selected mobility support technique with other entities.

In accordance with another example embodiment, a method for mobility support selection is provided. The method includes determining, by an entity, that an application executing on a mobile node requires session continuity, determining, by the entity, a mobility class of the application, determining, by the entity, a subset of a plurality of available application-based, host-based, and network-based mobility support techniques in accordance with the mobility class of the application, and selecting, by the entity, a mobility support technique from the subset of the plurality of available application-based, host-based, and network-based mobility support techniques.

In accordance with another example embodiment, an entity is provided. The entity includes a determining unit, a selecting unit operatively coupled to the determining unit, and a sharing unit operatively coupled to the selecting unit. The determining unit determines a mobility class of a first application executing on a device, and determines if a subset of a plurality of available mobility support techniques associated with the entity one of meets and exceeds requirements of the mobility class of the first application. The selecting unit select a mobility support technique out of a plurality of available mobility support techniques associated with the entity in accordance with the mobility class of the first application when the subset of the plurality of available mobility support techniques associated with the entity one of meets and exceeds the requirements of the mobility class of the first application. The sharing unit shares information related to the selected mobility support technique with other entities when the subset of the plurality of available mobility support techniques associated with the entity one of meets and exceeds the requirements of the mobility class of the first application.

Practice of the foregoing embodiments enables the selection of a mobility support option for a mobility event based on mobility requirements of the mobility event, as well as a class of service.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 4 illustrates an example arrangement of mobility support techniques highlighting their associated mobility classes according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to mobility support selection. For example, an entity determines a mobility class of a first application executing on a device, and determines if a subset of a plurality of available mobility support techniques associated with the entity one of meets and exceeds requirements of the mobility class of the first application. When the subset of the plurality of available mobility support techniques associated with the entity one of meets and exceeds the requirements of the mobility class of the first application, the entity selects a mobility support technique from the subset of the plurality of available mobility support techniques, evokes the selected mobility support technique, and shares information related to the selected mobility support technique with other entities.

The embodiments will be described with respect to example embodiments in a specific context, namely communications systems that provide mobility support (MS). The embodiments may be applied to standards compliant communications systems, such as those that are compliant with Third Generation Partnership Project (3GPP), IEEE 802.11, and the like, technical standards, and non-standards compliant communications systems, that provide mobility support.

Figure 1:
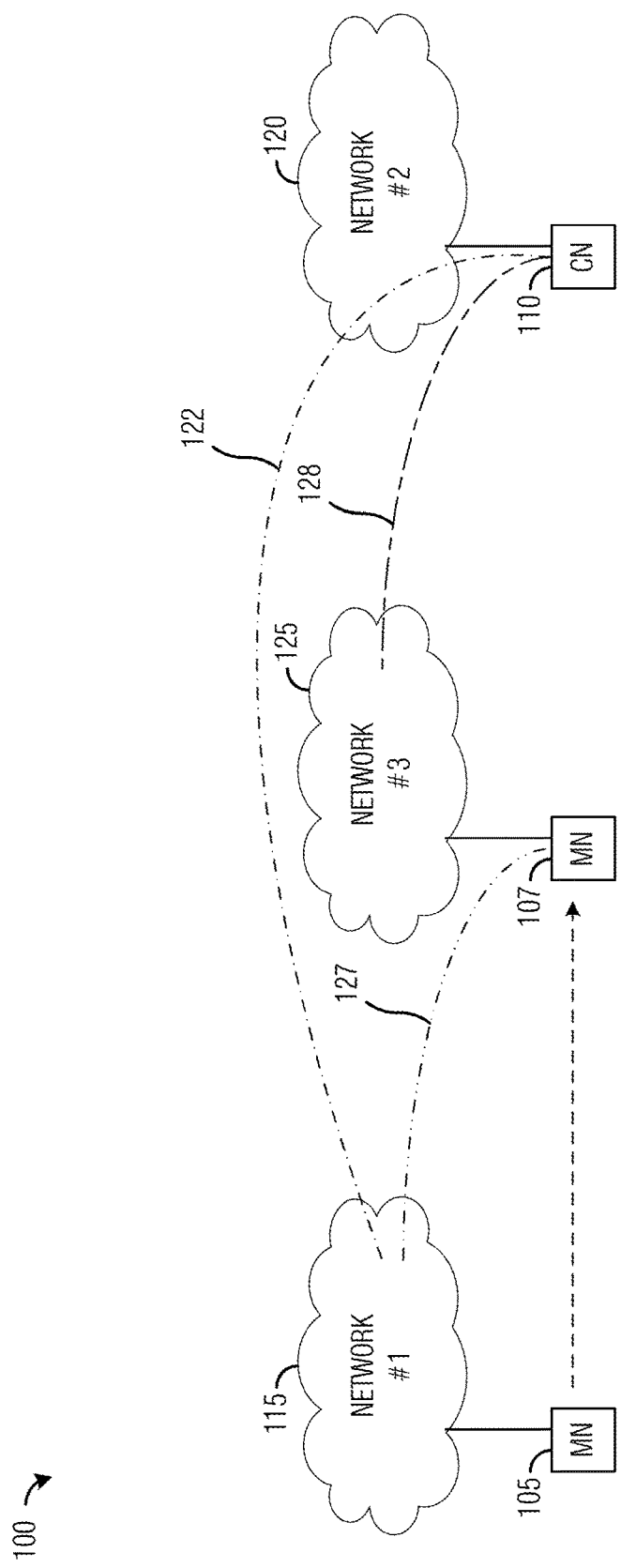
FIG. 1 illustrates an example communications system according to example embodiments described herein.

FIG. 1 illustrates an example communications system 100. Communications system 100 includes a mobile node (MN) 105 and a correspondent node (CN) 110. MN 105 is associated with a first network (network #1) 115, while CN 110 is associated with a second network (network #2) 120. CN 110 has established a session (shown as line 122) with MN 105. As an illustrative example, a packet sent from CN 110 to MN 105 may traverse second network 120 to first network 115 to MN 105. A packet from MN 105 to CN 110 may traverse a similar but reversed path.

MN 105 is capable of mobility and in the course of its mobility, MN 105 leaves first network 115 and becomes associated with a third network (network #3) 125. When associated with third network 125, MN 105 is shown as MN 107 to help reduce confusion. The mobility of MN 105 has resulted in a mobility event. Depending on how the mobility event is handled by mobility support provided in communications system 100, packets from CN 110 to MN 107 may traverse extra hop(s) (in addition to those from second network 120 to first network 115) from first network 115 to third network 125 (shown as line 127) or a new session connecting second network 120 to third network 125 (shown as line 128) is established.

While it is understood that communications systems may employ multiple networks capable of communicating with a number of nodes (such as MNs, CNs, and the like), only three networks, and a number of nodes are illustrated for simplicity.

As discussed previously, different applications have different mobility management needs. Some applications do not need session continuity, while others do. Furthermore, different applications have different quality of service (QoS) requirements, which have an impact on mobility management needs. As an illustrative example, a real-time application with a tight QoS requirement will not be served well by a mobility support technique with a handover delay on the order of 100 milliseconds or seconds. As another illustrative example, an application with large handover delay tolerance does not need the complexity and expense associated with a mobility support technique with a sub-millisecond handover delay.

According to an example embodiment, mobility management mechanisms are implemented at multiple levels. The implementation of mobility management mechanisms at different levels enable a selection of one or more mobility management mechanisms with the performance and cost to better meet the requirements and capabilities of an application requiring mobility support.

Mobility management mechanisms are available at a variety of levels, including but not limited to application layer mobility management, host-based mobility management, and network-based mobility management. Mobility management mechanisms at different levels offer different levels of performance at different costs in terms of complexity and expense. For example, application layer mobility management techniques are lower complexity techniques but have higher handover delays than network-based mobility support techniques. Conversely, network-based mobility support techniques offer lower handover delays but with increased complexity and cost.

According to an example embodiment, information is shared between the different levels of mobility management mechanisms. The information shared between the different levels of mobility management mechanisms may be used to inform a particular level that another level is unable to meet the requirements and capabilities of an application requiring mobility support. An intelligence associated with the mobility management mechanisms of the particular level may determine if one or more of them is capable of meeting the requirements and capabilities of the application. If one or more of the mobility management mechanisms of the particular level is capable of meeting the requirements and capabilities of the application, the information may stop being shared. Additional information may be shared between the different levels once one or more mobility management mechanisms have been selected. Furthermore, the information may be shared between the different levels regarding the mobility support techniques available.

According to an example embodiment, the information shared between the different levels of mobility management mechanisms are represented as indications. An indication of a selected mobility support technique is shared when a mobility support technique is selected. As an illustrative example, when a mobility support technique is selected from a plurality of application-based mobility support techniques, host-based mobility support techniques, and network-based mobility support techniques, an indication of the selected mobility support technique is shared between the different levels.

Figure 2:
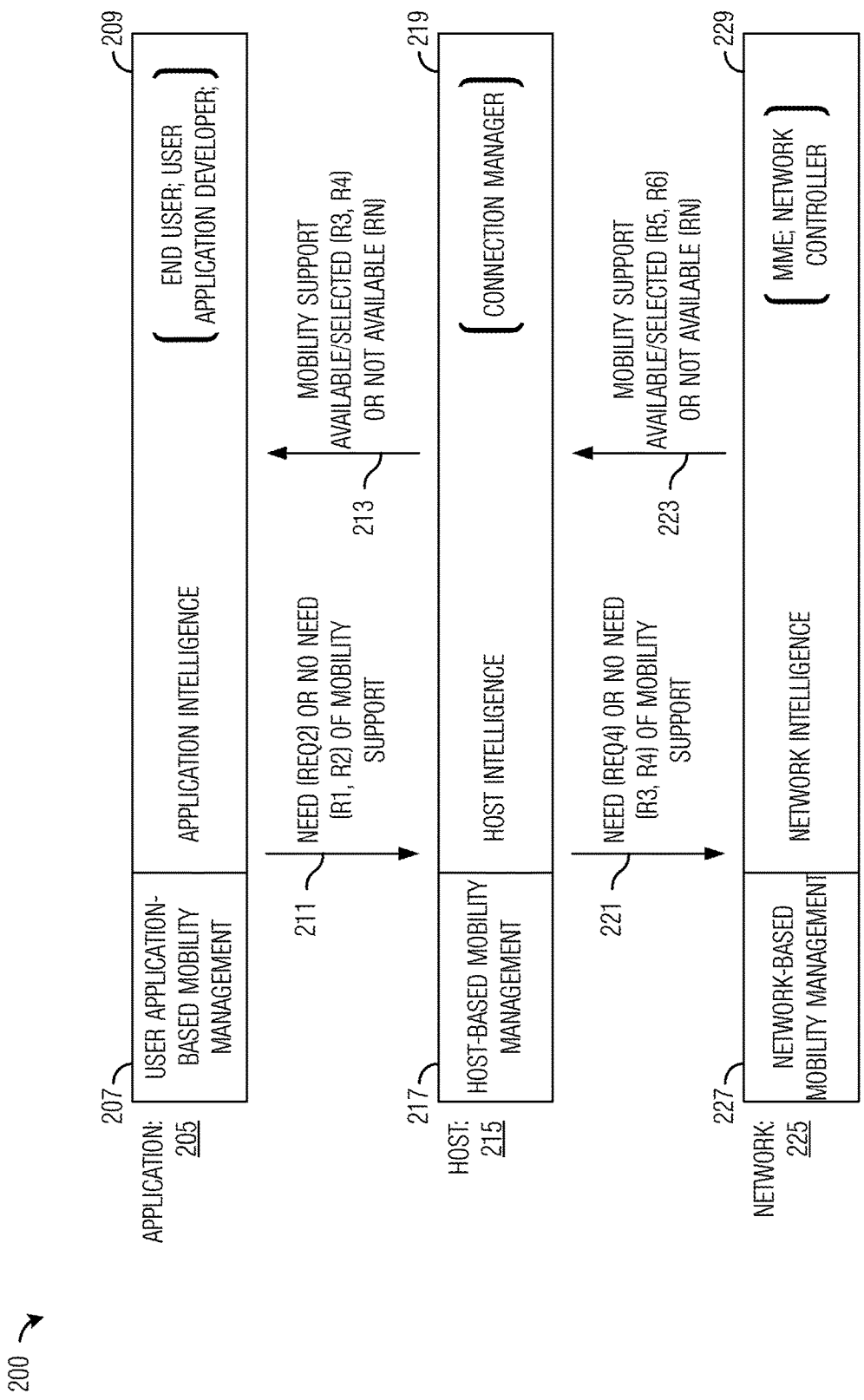
FIG. 2 illustrates a diagram of different levels of example mobility support techniques according to example embodiments described herein.

FIG. 2 illustrates a diagram 200 of different levels of example mobility support techniques. As shown in FIG. 2, there is an application layer 205, a host layer 215, and a network layer 225. Mobility support techniques in application layer 205 are classified as user application based mobility support techniques 207 and may be implemented using application intelligence 209 as provided by an end user or a developer of a user application. Mobility support techniques in host layer 215 are classified as host-based mobility support techniques 217 and may be implemented in host intelligence 219 as implemented in a connection manager executing in a host. Mobility support techniques in network layer 225 are classified as network-based mobility support techniques 227 and may be implemented in network intelligence 229 as implemented in a network mobility management system, such as a mobility management entity (MME) or a network controller.

Also shown in FIG. 2 is the information (e.g., in the form of an indication) shared between the different layers. As an illustrative example, if none of the user application-based mobility support technique in application layer 205 is capable of meeting the requirements and capabilities of the application, application intelligence 209 may share information with host intelligence 219 (shown as event 211). Similarly, host intelligence 219 may share information with network intelligence 229 if none of the host-based mobility support techniques is capable of meeting the requirements and capabilities of the application (shown as event 221). Once a mobility support technique of a layer is selected to provide mobility support for the application, additional information may be shared between the different levels, such as shown in FIG. 2 as events 213 and 223. The information shared between the entities of the layers is sent to the application that requires mobility support, but generally only after the capabilities of the current entity has been considered and deems not capable of supporting the mobility support requirements of the application. Once the information has been shared with another entity, the other entity assumes that applications associated with the connection need mobility support.

According to an example embodiment, a system and method for selecting mobility support and coordinating the selection among application layer, host layer, and network layer are provided. In addition, very many applications are expected to emerge in the future, and these applications are expected to have very diverse QoS requirements. On the other hand, multiple mobility solutions with different QoS capabilities are or will be available to meet the very diverse QoS requirements such as are expected in 4.5 G Wireless, 5G Wireless, and beyond. The system and method takes into consideration the QoS requirements of the application versus the QoS capabilities of the different mobility solutions when selecting the mobility support. To reduce the complexity of the selection with very many applications, the applications may be categorized into different class of services (CoS) with different QoS requirements, and specifically the QoS requirements in mobility, such as maximum handover delay and packet loss.

QoS requirements may be taken into consideration in the selection of mobility support techniques. Diverse QoS requirements are anticipated in 5G communications systems, and multiple mobility support techniques are available. The specific mobility support technique is chosen from among those that meet the QoS requirements. According to an example embodiment, system and method for selecting mobility support techniques categorizes the QoS requirements of the numerous applications into different CoS categories in 5G communications systems and takes the CoS into consideration when selecting an appropriate mobility support technique. CoS is already used in existing networks, and in 5G communications systems more categories of CoS may be needed. Specifically, the QoS requirements in a mobility event are considered in an example embodiment. They may include handover delay, packet loss tolerance, combinations thereof, and the like. For example, the application may require a certain maximum end-to-end packet delay, but in a mobility event, the application may require a certain maximum handover delay. Other applications may require a handover delay in the order of ms or even sub-ms. Some may be in the order of 10 ms, 100 ms, a second or 10 seconds.

According to an example embodiment, the selection of mobility support from a plurality of available mobility solutions is provided. The mobility support may be selected from a plurality of application-based, host-based, and network-based mobility support techniques. The plurality of application-based, host-based, and network-based mobility support techniques provide mobility solutions with different signaling costs, taking into consideration the QoS requirement of an application or mobility event, such as handover delay and/or packet loss tolerance, as well as selection of the mobility support, taking into consideration the QoS requirements and signaling cost. The plurality of application-based, host-based, and network-based mobility support techniques may be narrowed down by determining which ones meet the QoS requirements of the application or mobility event.

According to an example embodiment, a system and method determines the QoS capability of a mobility solution by taking into consideration the dynamic network conditions, and determines whether the mobility solution meets the QoS requirements of the application or mobility event. The application may be categorized into different CoS categories with diverse QoS requirements of a mobility event (such as different maximum handover delay) and narrows down the plurality of application-based, host-based, and network-based mobility support techniques to those that meet the QoS requirements of a CoS category. The selection of the mobility solution may be made from those that meet the QoS requirements of a CoS category to which an application has been categorized.

In 3GPP EPC network in the fourth Generation (4G) communications systems, the mobility management function generally resides in a mobility management entity (MME) and a packet data network (PDN) gateway (PGW), both in the network layer. In 4.5 Generation (4.5G) and fifth Generation (5G) communications systems, the mobility management function may reside in virtualized control plane and data plane network functions. A plurality of mobility support techniques already exists, whereas the emerging wireless applications are expected to be much more diverse in terms of QoS requirements compared with that in fourth Generation (4G) communications systems. Therefore, the selection of mobility support is then needed. Existing 3GPP communications systems use a one-size-fit-all mobility management solution, namely GTP. Yet the range of handover performance supported by GTP is very small compared with what are anticipated in the emerging applications in 4.5 G and 5G Wireless. An alternative to using a one-size-fit-all mobility solution without choice (other than not to use it at all, and use offload) may require a single solution to meet the most stringent requirements. This, however, generally would be overkill and might involve too much cost for the least demanding applications.

Figure 3:
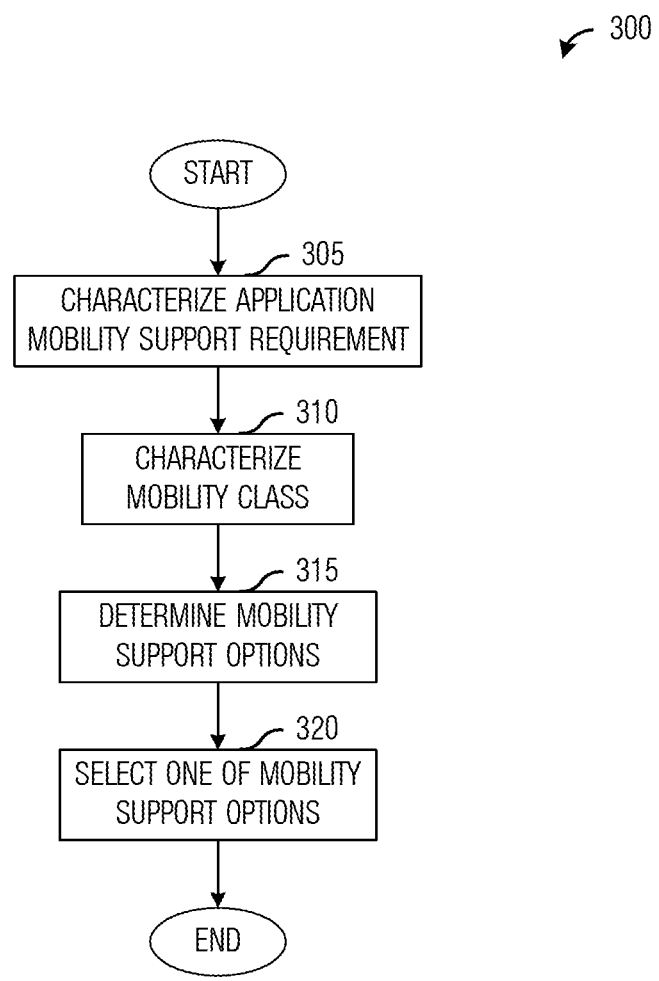
FIG. 3 illustrates a flow diagram of example operations occurring in the selection of a mobility support technique according to example embodiments described herein.

FIG. 3 illustrates a flow diagram of example operations 300 occurring in the selection of a mobility support technique. Operations 300 may be indicative of operations occurring in the selection of a mobility support technique while giving consideration to the requirements and capabilities of an application requiring mobility support.

Operations 300 begin with a characterization of the mobility support requirements of an application (block 305). Characterization of the mobility support requirements of the application may include determining a maximum tolerable handover delay, packet delay variance during handover, packet loss rate tolerance, and the like. An example characterization of the mobility support requirements of the application are the QoS requirements of the application. The mobility class of the application is also determined (block 310). The mobility class, e.g., CoS, may be determined from the characterization of the mobility support requirements of the application, e.g., the QoS requirements. One or more candidate mobility support options are determined from a plurality of mobility support options (block 315). The one or more candidate mobility support options are those out of the plurality of mobility support options that meet the mobility class of the application and/or the characterization of the mobility support requirements of the application. A mobility support option is selected from the one or more candidate mobility support options (block 320). The selected mobility support option may be selected from the one or more candidate mobility support options. The selection may be based on a variety of factors, such as associated complexity, associated costs, how well the candidate mobility support options meet the mobility class and/or characterization of the mobility support requirements of the application.

FIG. 4 illustrates an example arrangement 400 of mobility support techniques highlighting their associated mobility classes. In arrangement 400, mobility support techniques are arranged horizontally into different layers (e.g., application-layer techniques 405, host-layer techniques 407, network-layer techniques 409, and so on), while in a vertical dimension, appropriate classes for the mobility support techniques are presented (including techniques with maximum handover delays of up to 1 ms class 415, 10 ms class 417, 100 ms class 419, and 1 s class 421. Therefore, simplifying the selection of candidate mobility support techniques. As an illustrative example, if an application has a mobility support requirement that specifies that a maximum handover delay is 100 mS, the identification of candidate mobility support techniques may be as simple as selecting 1 mS class 415, 10 mS class 417, 100 mS class 419.

Each mobility support technique may have associated with it a QoS capability (i.e., performance limitation of the mobility support technique). The QoS capability of a mobility support technique may depend upon the condition of the communications system. In other words, the condition of the communications system may alter the QoS capability of a mobility support technique. Arrangement 400 may be altered after network condition is considered.

An application may be categorized into a mobility class (CoS category). For a given mobility class, there is a subset of mobility support techniques that meet the requirements associated with the mobility class. The selection of a mobility support technique is made from the subset of mobility support techniques that meet the requirements associated with the mobility class, thereby simplifying the selection process by potentially reducing the number of mobility support techniques. If none of the mobility support techniques meeting the requirements associated with the mobility class is available, alternative techniques may be utilized. As an example, a mobility support technique is selected from the mobility support techniques that do not meet the requirements associated with the mobility class. For example, a mobility support technique that most closely meets the requirements associated with the mobility class is selected. Alternatively, no mobility support is provided when there are no mobility support techniques available. An example selection of a mobility support technique is provided below.

According to an example embodiment, the selection of a mobility support technique takes the signaling overhead (a cost function) into consideration. As an example, network traffic is expected to grow dramatically in the near future, but signaling overhead is expected to grow at an even faster rate. The signaling overhead may need to be considered in the selection process if a good selection is to be made.

Figure 5:
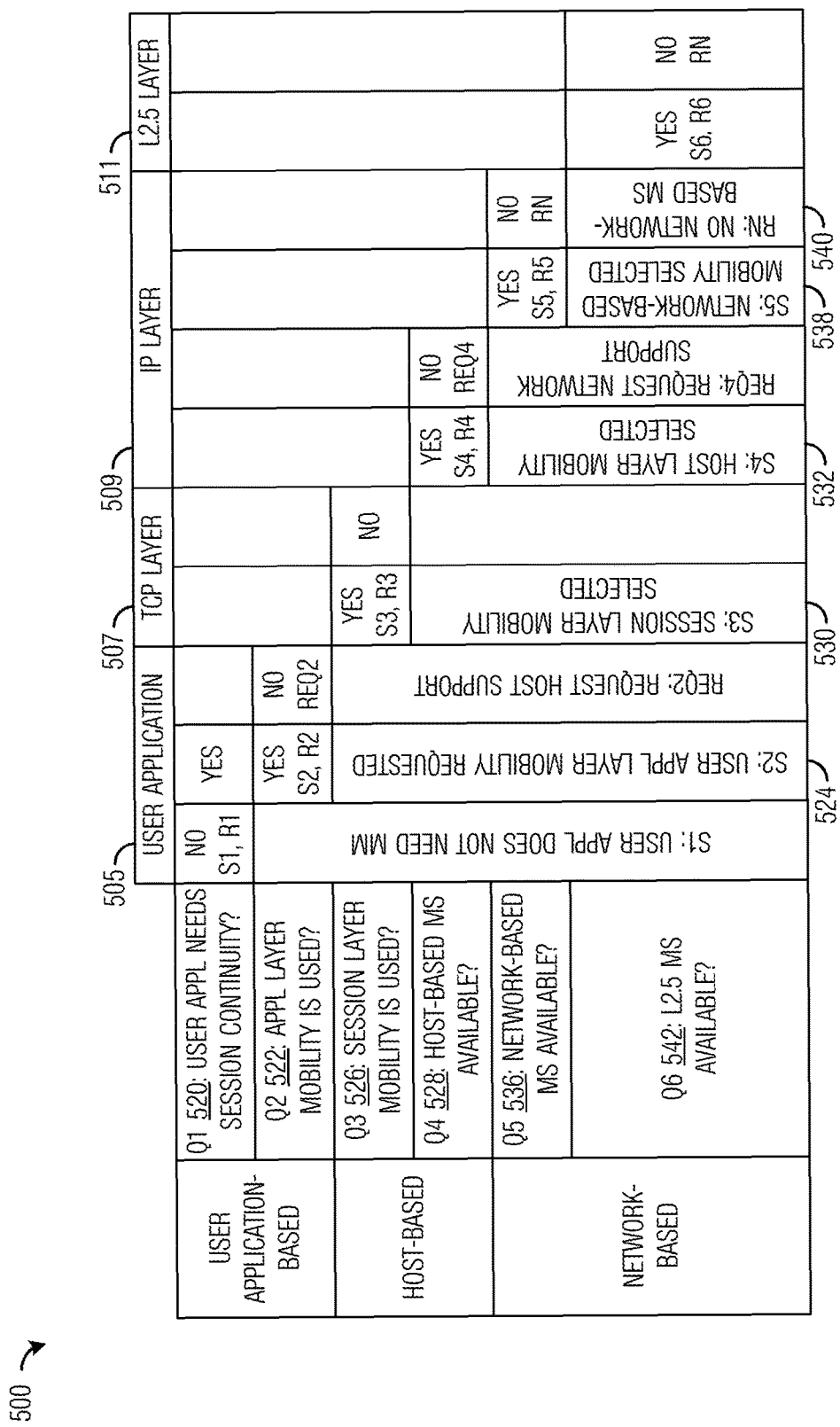
FIG. 5 illustrates an example mobility support technique selection data flow table highlighting the selection of mobility support techniques for an application according to example embodiments described herein.

FIG. 5 illustrates an example mobility support technique selection data flow table 500 highlighting the selection of mobility support techniques for an application. In table 500, example available mobility support techniques are shown in columns (such as application-layer 505, TCP layer 507, IP layer 509, and L2.5 layer 511) and example selection steps are shown in columns. The available mobility support techniques discussed in FIG. 5 may have been selected from a set of mobility support techniques as being mobility support techniques that expressly meet the requirements associated with the mobility class of the application.

A first decision (Q1 520) determines if the application needs session continuity and a second decision (Q2 522) determines if the application is able to continue operating upon a change in IP address as the MN moves from one network to another. If the answer to Q1 520 is no or if the answer to Q1 520 is yes and the answer to Q2 522 is yes, then the application does not need mobility support from the host or the network and the host determines that mobility support (either host-based or network-based) does not need to be invoked for the application and user application layer mobility support is requested (shown as event 524). Otherwise mobility support is needed. Such a decision and the indication of such a decision may be made using a variety of techniques. As an illustrative example, the decision is made during source IP address selection and it is possible to indicate the decision using IP address metadata or a flag associated with the IP address header. As another illustrative example, a list of applications that need mobility support is available in a configuration file for each operating system to facilitate the decision and the indication of the decision.

As shown in FIG. 5, two examples of host-based mobility support techniques are shown: a session layer technique such as multipath TCP and an IP layer technique such as host-based mobility IP. A third decision (Q3 526) determines if session layer mobility is used and a fourth decision (Q4 528) determines if host-based mobility support is available. If the answer to Q3 526 is yes, session layer mobility is selected (shown as event 530). If the answer to Q4 528 is yes, host layer mobility is selected (shown as event 532). If the host is supporting a session layer technique (e.g., multipath TCP) with the CN (which provides the needed mobility support), there may be no need to further invoke the IP layer technique. Host-based mobility support generally is not available by default. The host must have such capability and the network may also need to provide the needed capability to enable host-based mobility support. Host-based mobility support, compared to network-based mobility support, is a global rather than a local mobility management protocol. In terms of this consideration alone, host-based mobility support may be preferred when it is available. For other considerations such as QoS requirements discussed previously, the host may not need to invoke host-based mobility support even if such capabilities exist. In any case, the host decides to invoke or not to invoke host-based mobility support. If host-based mobility support is invoked, there is then no need for network-based mobility support. The network will need to know whether or not to invoke network-based mobility support, which may be provided by the indications of the selected mobility support technique, the available mobility support techniques, need or lack thereof for mobility support as discussed previously. It is noted that the two host-based mobility support techniques discussed herein are provided for discussion purposes only and that other host-based mobility support techniques may be used in replacement of or in addition to those discussed herein. Furthermore, the ordering of the host-based mobility support techniques may differ from what is shown in FIG. 5.

As shown in FIG. 5, two examples of network-based mobility techniques are shown: a link layer technique and an IP layer technique such as network-based mobile IP. A fifth decision (Q5 536) determines if network-based mobility support is available. Once it is known that network-based mobility support is needed (such as from the receipt of the indications), the network may invoke an appropriate network-based mobility support technique if one is available (shown as event 538). If network-based mobility support is not available, an indication that no network-based mobility support is available (shown as event 540). A sixth decision (Q6 542) determines if L2.5 mobility support is available. If L2.5 mobility support is available, L2.5 mobility support is invoked.

Figure 6:
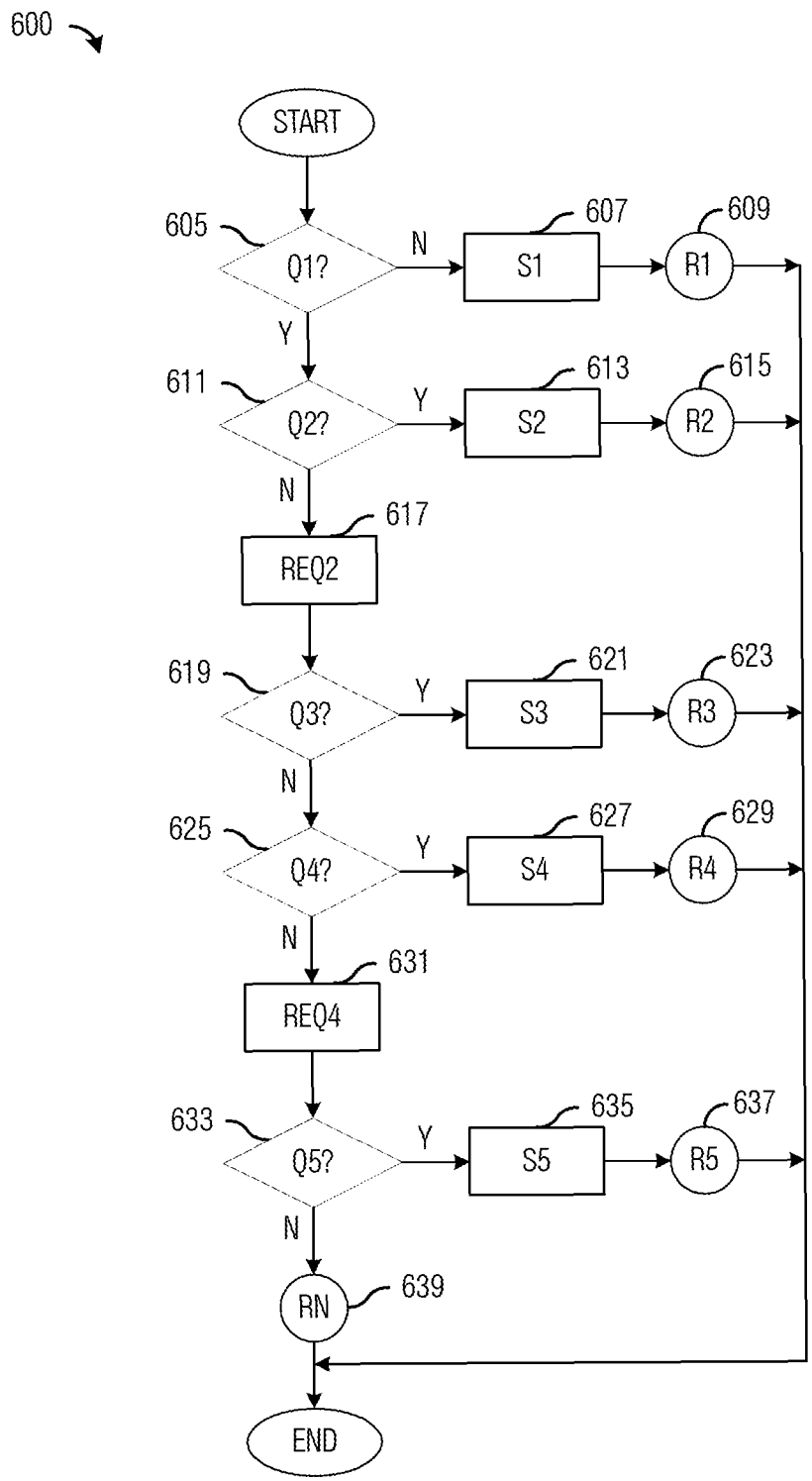
FIG. 6 illustrates a flow diagram of example operations representing the mobility support technique selection data flow shown in FIG. 5 according to example embodiments described herein.

FIG. 6 illustrates a flow diagram of example operations 600 representing the mobility support technique selection data flow shown in FIG. 5. Operations 600 begin with a first decision Q1 being performed to determine if the application needs session continuity (block 605). If the application does not need session continuity, an indication that the application does not need S1 is indicated (block 607) and no mobility support is invoked R1 (block 609). If the application needs session continuity, a second decision Q2 is performed to determine if the application is able to continue operating using a change in IP address (block 611). If the application is able to continue operating using the change in the IP address, an indication that application-based mobility support is selected S2 is indicated (block 613) and application-based mobility support is invoked R2 (block 615). The indications may be signaled in new message types that may be implemented by generalizing the connection policy to include information on which application needs mobility support and which application does not need mobility support. When a receiving entity receives the indications (e.g., a connection manager) may reply to the entity that sent the indications that the receiving entity is able to provide the mobility support requirements of the application, thereby permitting the continued execution of the application. The reply may be useful if mobility support is not available at the receiving entity, informing the entity that sent the indication that it needs to allow the application to lose session continuity and to restart the application.

If the application is unable to continue operating using the change in the IP address, an indication that host-based or network-based mobility support is needed REQ2 is indicated (block 617). A third decision Q3 is performed to determine if session layer mobility support can be used (block 619). If session layer mobility can be used, an indication that session layer mobility support is selected S3 is indicated (block 621) and session layer mobility support is invoked R3 (block 623). If session layer mobility cannot be used, a fourth decision Q4 is performed to determine if host-based mobility support can be used (block 625). If host-based mobility support can be used, an indication that host-based mobility support is selected S4 is indicated (block 627) and host-based mobility support is invoked R4 (block 629).

If host-based mobility support cannot be used, an indication that network-based mobility support is needed REQ4 (block 631). A fifth decision Q5 is performed to determine if network-based mobility support can be used (block 633). If network-based mobility support can be used, an indication that network-based mobility support is selected S5 is indicated (block 635) and host-based mobility support is invoked (block 637). If network-based mobility support cannot be used, no network-based mobility support is invoked (block 639).

According to an example embodiment, mobility support selection for different layers occurs in different entities. The selection of mobility support technique is performed at different entities for the different mobility support levels. Referring back now to FIG. 2, application-based mobility support selection may take place in an end user device, such as a MN and/or CN, while host-based mobility support selection may take place in a connection manager and network-based mobility support selection may take place in a MME or a network controller. According to an example embodiment, information is shared between the different entities to facilitate the selection. As an illustrative example, if an end user device determines that an application requires mobility support but application-based mobility support is not suitable per characterization of the mobility support requirements of the application or mobility class of the application, the end user device signals an indication to a host of the end user device and/or a network of the end user device to initiate the selection of a host-based and/or a network-based mobility support technique. Furthermore, the end user device may receive indications from the host and/or network indicating the availability or unavailability of host-based and/or network-based mobility support. Additionally, once a mobility support technique is selected and invoked, indications may be signaled to indicate the selection and invoking of said mobility support technique.

According to an example embodiment, the information shared between the entities provide indications regarding which applications need mobility support and which applications need mobility support, as well as a classification of the mobility support requirements of the applications needing mobility support. Such information may be listed in the configuration file of a given operating system. The information may allow the entities to determine the mobility support techniques that meet the mobility support requirements of the applications and to select from only those mobility support techniques, thereby simplifying the selection process.

Figure 7:
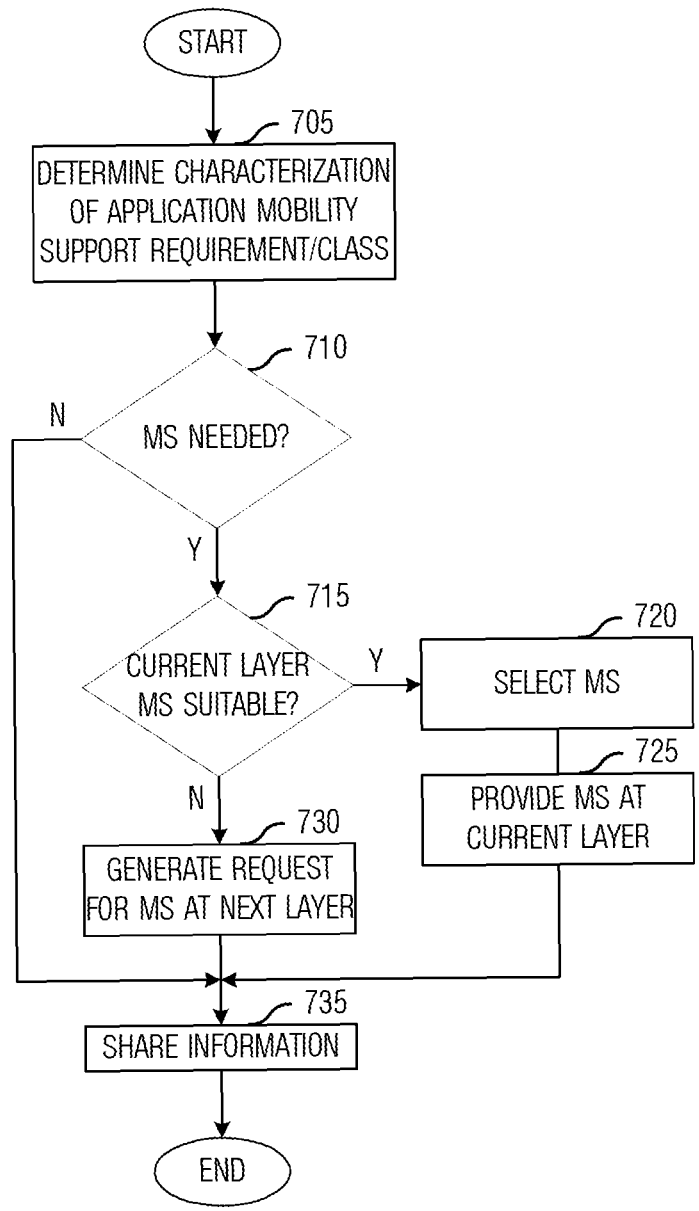
FIG. 7 illustrates a flow diagram of example operations occurring in an entity selecting a mobility support technique for an application according to example embodiments described herein.

FIG. 7 illustrates a flow diagram of example operations 700 occurring in an entity selecting a mobility support technique for an application. Operations 700 may be indicative of operations occurring in an entity, such as an end user device (e.g., MN, CN, and the like), a connection manager, a MME, a network controller, and so on, as the entity selects a mobility support technique for an application. Each entity involved in the selecting of a mobility support technique for an application may independently select a mobility support technique that meets the needs of the application based on requirements and classification of the application once it has received a request to do so. If an entity is unable to select a mobility support technique for the application, it may request another entity to attempt the selection.

Operations 700 begin with the entity determining a characterization of the mobility support requirement and/or mobility class of the application (block 705). Characterization of the mobility support requirement may be related to QoS requirements of the application, such as a maximum handover delay, average handover delay, packet loss, and so forth. The mobility class of the application may a classification of the mobility support requirements (e.g., QoS requirements) quantified into a CoS with different QoS requirements. The entity may perform the characterization by itself. Alternatively, the entity may receive an indication of the characterization from another entity. An example to convey such information of a given application to the device is to add such information to the configuration file of the operating system used by the device.

The entity performs a check to determine if mobility support is needed (block 710). The check to determine if mobility support is needed may be in accordance with the characterization of the mobility support requirement and/or the mobility class of the application. If mobility support is needed, the entity performs another check to determine if any of the mobility support techniques associated with the entity are suitable for the application (block 715). A mobility support technique is suitable if the technique meets the mobility support requirements of the application and/or the mobility class of the application. If one or more of the mobility support techniques associated with the entity is suitable for the application, the entity selects a mobility support technique for the application (block 720) and provides mobility support for the application (block 725).

If none of the mobility support techniques associated with the entity are suitable for the application (in other words, none of the mobility support techniques associated with the entity meet the mobility support requirement of the application and/or in the mobility class of the application or better) or if none of the mobility support techniques associated with the entity that are suitable are available, the entity may send a request for mobility support at a different layer to another entity associated with the different layer (block 730). The request for mobility support may be an explicit request for mobility support, such as REQ2 617 and REQ4 631 shown in FIG. 6. The entity may receive a message in response to the request for mobility support indicating that the entity receiving the request for mobility support does not provide mobility support (e.g., there is no mobility support at all, available mobility support does not meet the mobility class and/or mobility support requirement, or mobility support does meet the mobility class and/or mobility support requirement but is unavailable).

The entity shares information (block 735). The information shared may be in the form of indications that are signaled to other entities. The information may include selected mobility support technique, indication of mobility support being invoked, available mobility support techniques, unavailable mobility support techniques, requests for mobility support, need for mobility support, no need for mobility support, and so on.

Figure 8:
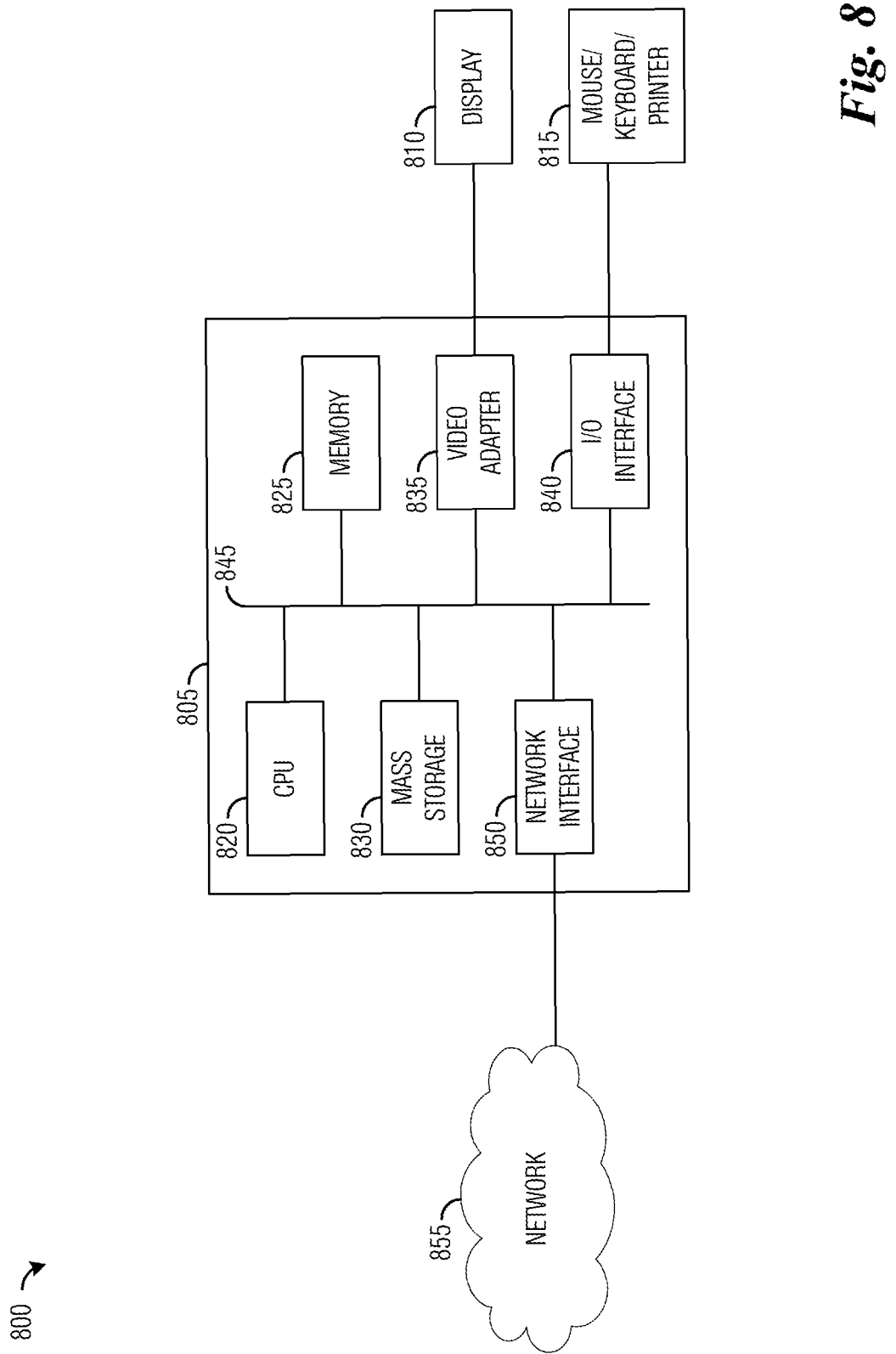
FIG. 8 is a block diagram of a processing system that may be used for implementing the devices and methods disclosed herein.

FIG. 8 is a block diagram of a processing system 800 that may be used for implementing the devices and methods disclosed herein. In some embodiments, the processing system 800 comprises a UE. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 815 (including speaker, microphone, mouse, touchscreen, keypad, keyboard, printer, and the like), display 810, and so on. The processing unit may include a central processing unit (CPU) 820, memory 825, a mass storage device 830, a video adapter 835, and an I/O interface 840 connected to a bus 845.

The bus 845 may be one or more of any type of several bus architectures including a memory bus or memory controller, a peripheral bus, video bus, or the like. The CPU 820 may comprise any type of electronic data processor. The memory 825 may comprise any type of system memory such as static random access memory (SRAM), dynamic random access memory (DRAM), synchronous DRAM (SDRAM), read-only memory (ROM), a combination thereof, or the like. In an embodiment, the memory 825 may include ROM for use at boot-up, and DRAM for program and data storage for use while executing programs.

The mass storage device 830 may comprise any type of storage device configured to store data, programs, and other information and to make the data, programs, and other information accessible via the bus 845. The mass storage device 830 may comprise, for example, one or more of a solid state drive, hard disk drive, a magnetic disk drive, an optical disk drive, or the like.

The video adapter 835 and the I/O interface 840 provide interfaces to couple external input and output devices to the processing unit 805. As illustrated, examples of input and output devices include the display 810 coupled to the video adapter 835 and the mouse/keyboard/printer 815 coupled to the I/O interface 840. Other devices may be coupled to the processing unit 805, and additional or fewer interface devices may be utilized. For example, a serial interface such as Universal Serial Bus (USB) (not shown) may be used to provide an interface for a printer.

The processing unit 805 also includes one or more network interfaces 850, which may comprise wired links, such as an Ethernet cable or the like, and/or wireless links to access nodes or different networks 855. The network interface 850 allows the processing unit 805 to communicate with remote units via the networks 855. For example, the network interface 850 may provide wireless communication via one or more transmitters/transmit antennas and one or more receivers/receive antennas. In an embodiment, the processing unit 805 is coupled to a local-area network or a wide-area network 855 for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for mobility support selection, the method comprising:
   determining, by an entity, a mobility class of a first application executing on a device;
   determining, by the entity, if a subset of a plurality of available mobility support techniques associated with the entity meets or exceeds requirements of the mobility class of the first application; and
   in response to the subset of the plurality of available mobility support techniques associated with the entity meeting or exceeding the requirements of the mobility class of the first application,
selecting, by the entity, a mobility support technique from the subset of the plurality of available mobility support techniques, the selecting comprising:
selecting a user application-based mobility support technique if one is in the subset,
if there are no user application-based mobility support techniques in the subset, selecting a host-based mobility support technique if one is in the subset,
if there are no user application-based or host-based mobility support techniques in the subset, selecting a network-based mobility support technique if one is in the subset, and
if there are no user application-based, host-based or network-based mobility support techniques in the subset, sending a request for mobility support to another entity;
implementing, by the entity, the selected mobility support technique for the first application executing on the device; and
sharing, by the entity, information related to the selected mobility support technique with other entities.

2. The method of claim 1, further comprising:
in response to none of the mobility support techniques being available for a second mobility class of a second application, sending a request for mobility support to one of the other entities.

3. The method of claim 1, wherein determining the mobility class comprises:
determining mobility requirements of the first application; and
determining the mobility class of the first application in accordance with the mobility requirements.

4. The method of claim 3, wherein the mobility requirements of the first application comprise quality of service (QoS) requirements of the first application, and wherein the mobility class of the first application comprises a class of service (CoS) of the first application.

5. The method of claim 3, wherein the mobility requirements comprises at least one of a maximum handover delay or a packet loss rate.

6. The method of claim 1, wherein determining the mobility class comprises receiving an indication of the mobility class of the first application from one of the other entities.

7. The method of claim 1, wherein the information further comprises an availability of the mobility support techniques associated with the entity, and an unavailability of the mobility support techniques associated with the entity.

8. The method of claim 1, further comprising receiving additional information from at least one of the other entities, the additional information comprising an availability of mobility support techniques associated with the at least one of the other entities, and an unavailability of the mobility support techniques associated with the at least one of the other entities, and a request for the entity to select the mobility support technique out of a plurality of available mobility support techniques associated with the entity for the first application.

9. The method of claim 1, wherein the entity comprises one of an end user device, a connection manager, or a mobility management entity.

10. The method of claim 1, further comprising:
determining that a second application does not need mobility support; and
sharing information related to the second application with the other entities.

11. A method for mobility support selection, the method comprising:
determining, by an entity, that an application executing on a mobile node requires session continuity;
determining, by the entity, a mobility class of the application;
determining, by the entity, a subset of a plurality of available user application-based, host-based, and network-based mobility support techniques in accordance with the mobility class of the application;
selecting, by the entity, a mobility support technique from the subset of the plurality of available user application-based, host-based, and network-based mobility support techniques, the selecting comprising:
selecting a user application-based mobility support technique if one is in the subset;
if there are no user application-based mobility support techniques in the subset, selecting a host-based mobility support technique if one is in the subset;
if there are no user application-based or host-based mobility support techniques in the subset, selecting a network-based mobility support technique if one is in the subset, and
if there are no user application-based, host-based or network-based mobility support techniques in the subset, sending a request for mobility support to another entity; and
implementing the mobility support technique for the application executing on the mobile node requiring session continuity.

12. The method of claim 11, wherein the mobility class of the application is determined from a mobility requirement of the application.

13. The method of claim 11, wherein selecting the mobility support technique comprises:
selecting the mobility support technique from available user application-based mobility support techniques in response to the application being able to continue operating in response to the mobile node moving between networks;
selecting the mobility support technique from available host-based mobility support techniques in response to one of session layer mobility or host-based mobility management being available; or
selecting the mobility support technique from available network-based mobility support techniques in response to one of network-based mobility management or a $L_{2.5}$ network being available.

14. The method of claim 11, wherein determining the subset of the plurality of available user application-based, host-based, and network-based mobility support techniques comprises selecting available mobility support techniques meeting the mobility class of the application for the subset.

15. The method of claim 14, wherein determining the subset of the plurality of available user application-based, host-based, and network-based mobility support techniques further comprises selecting available mobility support techniques exceeding the mobility class of the application for the subset.

16. An entity comprising:
a non-transitory memory storage comprising instructions; and
one or more processors in communication with the non-transitory memory storage, wherein the one or more processors execute the instructions to:

determine a mobility class of a first application executing on a device;
determine if a subset of a plurality of available mobility support techniques associated with the entity meets or exceeds requirements of the mobility class of the first application;
select a mobility support technique out of a plurality of available mobility support techniques associated with the entity in accordance with the mobility class of the first application in response to the subset of the plurality of available mobility support techniques associated with the entity meeting or exceeding the requirements of the mobility class of the first application, the instructions to select comprising instructions to:
  select a user application-based mobility support technique if one is in the subset;
  if there are no user application-based mobility support techniques in the subset, select a host-based mobility support technique if one is in the subset;
  if there are no user application-based or host-based mobility support techniques in the subset, select a network-based mobility support technique if one is in the subset;
  if there are no user application-based, host-based or network-based mobility support techniques in the subset, sending a request for mobility support to another entity;
implement the selected mobility support technique for the first application executing on the device in response to the subset of the plurality of available mobility support techniques associated with the entity meeting or exceeding the requirements of the mobility class of the first application; and
share information related to the selected mobility support technique with other entities in response to the subset of the plurality of available mobility support techniques associated with the entity meeting or exceeding the requirements of the mobility class of the first application.

17. The entity of claim 16, wherein the one or more processors execute the instructions to send a request for mobility support to one of the other entities in response to none of the mobility support techniques being available for a second mobility class of a second application.

18. The entity of claim 16, wherein the one or more processors execute the instructions to:
  determine mobility requirements of the first application, and
  determine the mobility class of the first application in accordance with the mobility requirements.

19. The entity of claim 16, wherein the one or more processors execute the instructions to determine the mobility class from an indication of the mobility class of the first application received from one of the other entities.

20. The entity of claim 16, further comprising a receiver operatively coupled to the one or more processors, the receiver configured to receive additional information from at least one of the other entities, the additional information comprising:
  an availability of mobility support techniques associated with the at least one of the other entities,
  an unavailability of the mobility support techniques associated with the at least one of the other entities, and
  a request for the entity to select the mobility support technique out of a plurality of available mobility support techniques associated with the entity for the first application.

21. The entity of claim 16, wherein the entity is one of an end user device, a connection manager, or a mobility management entity.

22. The entity of claim 16, wherein the one or more processors execute the instructions to:
  determine that a second application does not need mobility support, and
  share information related to the second application with the other entities.

* * * * *